US007853557B2

(12) United States Patent
Schneider et al.

(10) Patent No.: US 7,853,557 B2
(45) Date of Patent: Dec. 14, 2010

(54) METHOD AND COMPUTER FOR RESPONDING TO A QUERY ACCORDING TO THE LANGUAGE USED

(75) Inventors: Stacey Schneider, San Francisco, CA (US); Daniel Salzer, Piedmont, CA (US); David Tchankotadze, Sunnyvale, CA (US); Kanchan Shringi, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 619 days.

(21) Appl. No.: 10/173,464

(22) Filed: Jun. 14, 2002

(65) Prior Publication Data

US 2007/0244853 A1   Oct. 18, 2007

(51) Int. Cl.
*G06F 7/00* (2006.01)
(52) U.S. Cl. ..................................... 707/608
(58) Field of Classification Search ................. 707/3–8, 707/608; 704/7, 8
See application file for complete search history.

(56) References Cited

U.S. PATENT DOCUMENTS

| | | | | |
|---|---|---|---|---|
| 5,946,487 | A * | 8/1999 | Dangelo | 717/148 |
| 6,349,276 | B1 * | 2/2002 | McCarley | 704/8 |
| 6,623,529 | B1 * | 9/2003 | Lakritz | 715/536 |
| 2003/0110186 | A1 * | 6/2003 | Markowski et al. | 707/104.1 |
| 2003/0167250 | A1 * | 9/2003 | Sash | 707/1 |

FOREIGN PATENT DOCUMENTS

WO   WO 01/65388 A1 *   9/2001

OTHER PUBLICATIONS

Morin, Randy Charles, "C++ and Threads," Copyright 2001-2002.
Screen shot (generated Jan. 4, 2009) showing document properties of "C++ And Threads," by Randy Charles Morin, Nov. 14, 2002, as posted at "http://www.kbcafe.com/articles/HowTo.Thread.pdf".
Screen shot (generated Jan. 4, 2010 [Corrected Date]) showing document properties of "C++ and Threads," by Randy Charles Morin, Nov. 14, 2002, as posted at "http://www.kbcafe.com/articles/HowTo.Thread.pdf".

* cited by examiner

*Primary Examiner*—Don Wong
*Assistant Examiner*—Michael Le
(74) *Attorney, Agent, or Firm*—Campbell Stephenson LLP

(57) ABSTRACT

A method of, and a computer for, processing a query. The method includes receiving the query in a first language at a computerized messaging device, the first language being one of different languages. A template in the first language is then selected from one of the different languages and query data corresponding to the first language is retrieved from a database of query data. The method includes populating the template with template data corresponding to the first language to define a query response in the query language, and communicating the query response from the device to a recipient.

57 Claims, 13 Drawing Sheets

FIG. 6

| LOCALE CODE | LOCALE NAME | DATE | TIME | CURRENCY | | |
|---|---|---|---|---|---|---|
| ENU | ENGLISH - USA | MM/DD/YY | | $ | | |
| ENG | ENGLISH - UK | DD/MM/YY | | £ | | |
| FRA | FRENCH - FRANCE | | | | | |
| FRB | FRENCH - BELGIUM | | | | | |
| FRC | FRENCH - CANADA | | | | | |

PRODUCTS S_PRODUCTS

| PRODUCT | TRANSLATE | TRANSLATION TABLE NAME | |
|---|---|---|---|
| PROD_NAME | Y | S_PROD_LANG | |
| DESCRIPTION | Y | S_PROD_LANG | |
| PROD_NAME | | | |
| DESCRIPTION | | | |

124, 126, 124, 126 — 128 — 122

S_PROD_LANG - TRANSLATIONS

| LANG CODE | | | |
|---|---|---|---|
| ENU | | | |
| ENG | | | |
| FRA | | | |
| DEU | | | |

MLOV

| TYPE | NAME | VALUE | LANG. CODE |
|---|---|---|---|
| SALUTATION | Mr | Mr | ENU |
| | Mr | Mr | ENG |
| | Mr | Monsieur | FRA |
| | | | DEU |

METHOD AND COMPUTER FOR RESPONDING TO A QUERY ACCORDING TO THE LANGUAGE USED

FIELD OF THE INVENTION

The present invention relates generally to computerized responses to queries and, more specifically, to a method of, and computer for, responding to a query.

BACKGROUND OF THE INVENTION

Centralized facilities are often provided for responding to customer queries from various geographic locations. Such facilities may have a number of different applications running to respond to customer queries and, in certain circumstances, queries may be routed between different facilities for load sharing purposes. Due to the global nature of business, the queries received from the customers may be in a variety of different languages. In order to accommodate different queries in different languages, each facility may provide a separate application dedicated to a particular language. Accordingly, once a language associated with an incoming query has been determined, the query is then routed to an independent application dedicated to the particular language. This method typically requires a separate agent, fluent in the particular language, to attend to a request in the particular language using the particular application dedicated to the particular language.

In order to facilitate responding to customer queries, a facility typically has a plurality of predefined templates each of which are associated with a particular query. The template contains a narrative of the response to be sent to the customer, and "place holders" or fields requiring customer specific data. The agent may then merely populate the template, as this requires far less time than generating a response from scratch.

SUMMARY OF THE INVENTION

A method of, and a computer for, processing a query are provided. The method comprises receiving the query in a first language at a computer, the first language being one of a plurality of different languages. A template in the first language is then selected from one of a plurality of different languages and query data corresponding to the first language is retrieved from a database of query data. The method includes populating the template with template data corresponding to the first language to define a query response in the first language, and communicating the query response from the computer to a recipient.

Other features of the present invention will be apparent from the accompanying drawings and from the detailed description, which follows.

BRIEF DESCRIPTION OF THE DRAWINGS

The present invention is illustrated by way of example, and not limitation, in the figures of the accompanying drawings, in which like references indicate similar elements and in which:

FIGS. 6 to 9 show exemplary tables used to store the template data;

DETAILED DESCRIPTION

A method of, and a computer for, processing a query are described. In the following description, for purposes of explanation, numerous specific details are set forth in order to provide a thorough understanding of the present invention. It will be evident, however, to one skilled in the art that the present invention may be practiced without these specific details.

Figure 1:
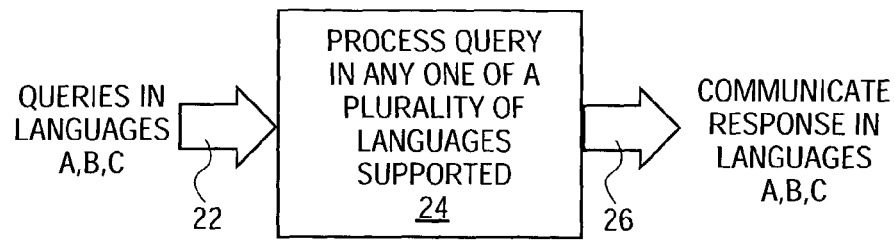
FIG. 1 shows a schematic diagram of an exemplary method and computer, in accordance with an aspect of the invention, for responding to a query.

Referring in particular to FIG. 1, an exemplary flow diagram is illustrated describing, from a high level, a method in accordance with an aspect of the invention for processing a query in any one of a plurality of languages. The method of FIG. 1 is typically implemented in a single, multi-threaded, computer application in which changes between different languages and different locales during processing take place dynamically. For example, a sequence of queries in languages A, B and C, as shown by arrow 22 in FIG. 1, may be received by a computer 24 which then processes each query in a multi-threaded fashion and generates a response to each query in the same language that the query was received in. Thereafter, the response is communicated to a recipient as shown by arrow 26. In addition to processing the query in any one of the plurality of languages supported, the computer 24 allows an agent, using the computer 24, to view and populate a template in a selected agent language which may be different from a first or query language in which the query was received. Thus, in certain embodiments, the computer 24 may use a single application, which interfaces with the agent in his or her preferred selected agent language, but receives queries and responds to queries in a different query language.

With the explosion of the Internet, facilities such as call centers responding to customer queries, may receive queries from various different regions or countries in which different languages are spoken. In addition to the different languages, each particular country may have preferred locale rules relating to the format or manner in which a response to a query should be set out, for example, formatting the date as either mm/dd/yy or dd/mm/yy. In addition, in order to balance loads at different facilities or call centers, queries are often routed to different call centers and, it will thus be appreciated, that processing the queries in a multi-lingual fashion facilitates this process.

Figure 2:
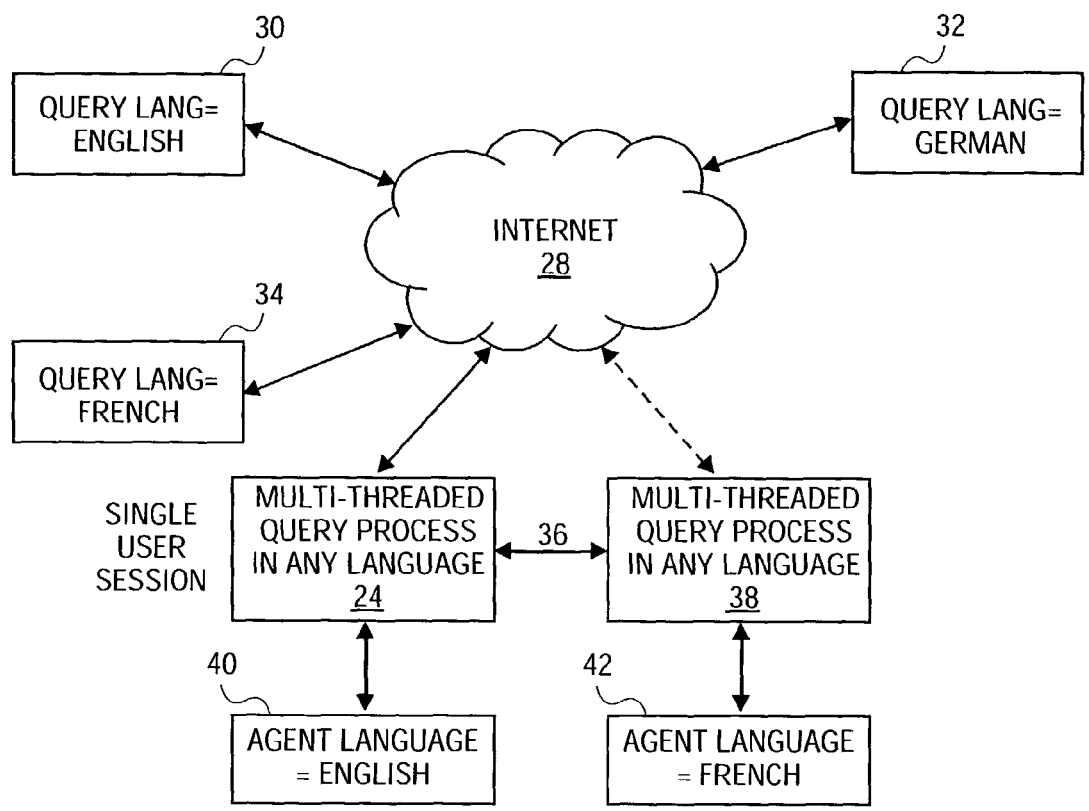
FIG. 2 shows a schematic diagram of the method implemented in an Internet environment.

For example, when the invention is implemented in an Internet environment, in FIG. 2 the computer 24 is connected to the Internet 28, and may receive a query in English from a customer 30 in England, a query in German from a customer 32 in Germany, and a query in French from a customer 34 located in France. The computer 24 may then in a single user session process any one or more of the queries or, in the event of the computer 24 being overloaded, redirect any one or more of the queries requiring processing, as shown by line 36 in FIG. 2, to a similar computer 38, located at a different facility, which would then process the query irrespective of the query language. In one embodiment, the computers 24, 38 may in addition process a query in an agent language that differs from the query language. Thus, an agent 40 of FIG. 2, that is associated with the computer 24, may process any one of the queries from the customers 30, 32, 34 in English, and an agent 42, to which any one of the queries has been routed, may process the routed query or queries in French. However, responses from both computers 24, 38 are sent out in the same language in which the query was received.

In one embodiment, the computer 24 operates in a totally automated fashion without user intervention. However, in other embodiments, the computer 24 requires input from an operator or agent. When requiring input from an agent or operator, the agent may identify a particular template to respond to the query, as well as the particular language in which the template is to be provided.

Figure 3:
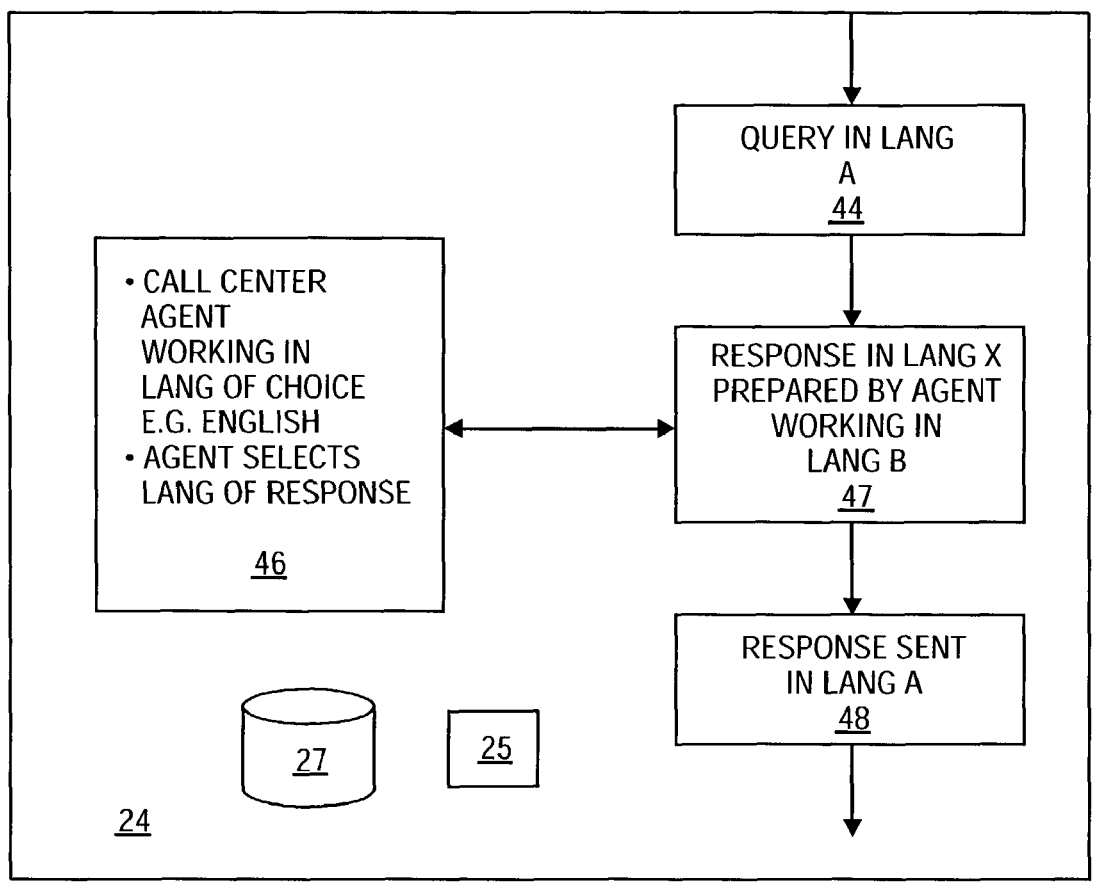
FIG. 3 shows a schematic flow diagram of the method executed by the computer of FIG. 1.

FIG. 3 shows a high level view of how the computer 24, in one embodiment, allows the processing of queries in an agent language that is different from the query language. In one embodiment, the computer 24 typically has a default language set to the language of choice of the agent upon installation. For example, if the computer 24 is installed in the United States of America, the agent language is typically English and, accordingly, in this embodiment all interaction via a display of the computer 24 with an agent is in English, unless the agent language is specifically changed. Accordingly, in this embodiment a display screen of the computer 24 displays templates, suitable for responding to the query as well as data to populate the template, in the agent language. In block 44, when, for example, a query is received in language A, the agent at an exemplary call center or facility 46 identifies the particular language of the query, as well as the particular template that is suitable to respond to the query. The agent then enters the query language into the computer 24 using a drop down menu of the computer 24. The computer 24 then, in an automated fashion in one embodiment, populates a corresponding template in language A with template data corresponding to language A. In block 47 the operator or agent views the response in the agent language which is his or her language of choice. Thereafter, in block 48, the response is sent in the query language (query language A) to the recipient. In order to perform its various functions the computer 24 has a processor 25 which accesses a database 27.

Figure 4:
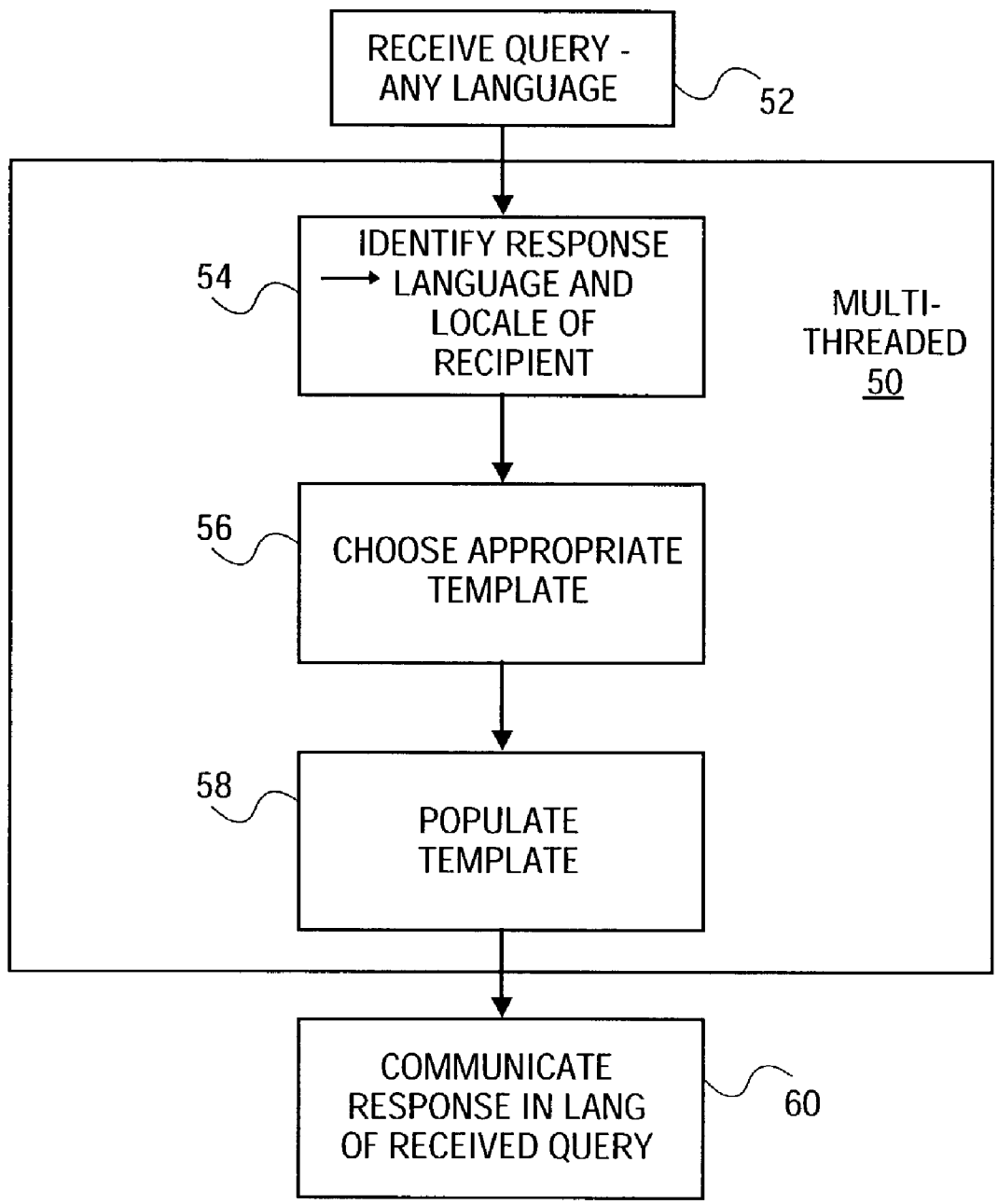
FIG. 4 shows a more detailed schematic flow diagram of the exemplary method implemented by a multi-threaded software application.
Figure 5:
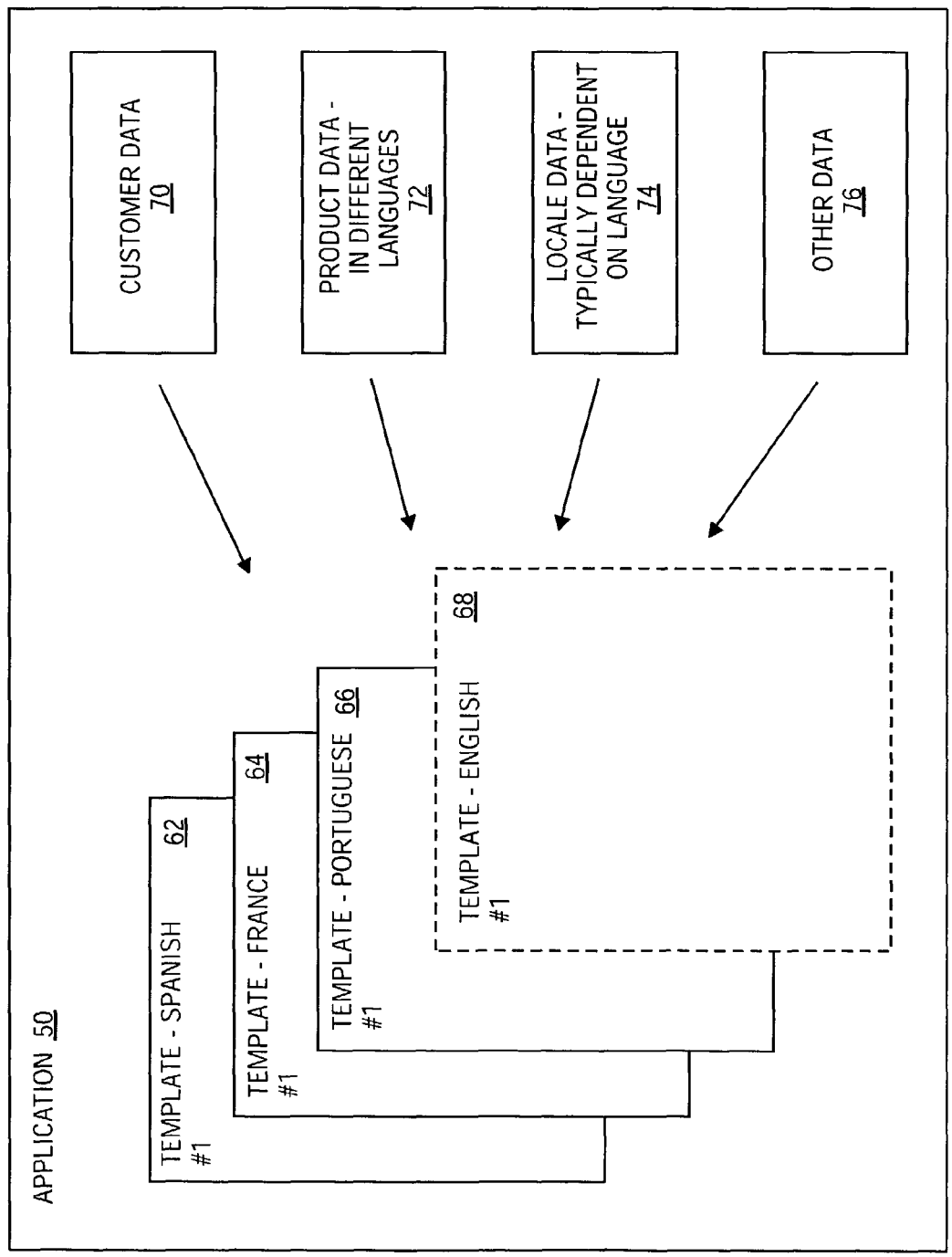
FIG. 5 shows a schematic high-level representation of exemplary templates and associated template data used in the method.

Referring in particular FIG. 4, an exemplary software application 50, also in accordance with an aspect of the invention, is illustrated. The software application 50 can be run on the computer 24 to process queries in different languages. The application 50 is a multi-threaded application so that it can process queries in different languages, and also process one or more queries simultaneously or concurrently. In block 52 of FIG. 4, the application 50 receives a query in any one of the languages supported whereafter, in block 54, the application 50 identifies the query language and locale of the recipient. Thereafter, in block 56, an appropriate template of FIG. 5 is chosen and the template is then populated in block 58. The functionality carried out in blocks 54, 56 and 58 forms part of a single thread of the multi-threaded application 50. Accordingly, in one embodiment, the functionality in blocks 54, 56 and 58 of the application 50 may be repeated for each different thread which is executed by the application 50 in any single user session. After a particular thread has processed the query and generated a response in the particular language in which the query was received (the query language), the response is then communicated to the recipient in block 60. In one embodiment, multiple instances of the application 50 are provided on a plurality of servers so as to accommodate a large number of queries such as those typically received via the Internet.

As shown in FIG. 5, the application 50 includes a plurality of different templates in a plurality of different languages. In one embodiment, different templates types may be provided for different types of queries and each template type is also provided in different languages. Accordingly, as shown in FIG. 5, each template which, for example, relates to a specific product query, may be provided as a Spanish template 62, a French template 64, a Portuguese Template 66, an English template 68, and any other languages which the application 50 may support. Likewise, different template types may be provided for different products or different queries and the appropriate template type that answers the query is chosen in block 56 of FIG. 4. Once the appropriate template type to address the query has been chosen, a specific template in the query language is then chosen. The specific template is then populated in block 58 using, for example, data from tables such as customer data tables 70, product data tables 72, locale data tables 74, and any other relevant data tables 76 which the template may require. The tables 70, 72, 74 and 76 may be provided in the database 27.

An example of a template is as follows:

Dear [First Name] [Last Name],

We have received your complaint against [Product Number], [Product Description] and a Service Request [Service Request Number] has been logged to track the progress on resolving it. The current status of the Service Request is [Service Request Status]. If you do not hear from us by [Expected Resolution Date], please call [Phone Number].

In one embodiment, the above exemplary template is provided in all the different languages supported by the application 50. The templates in each language include placeholders or fields for receiving template data associated with the particular query. The template data included in the fields or placeholders may or may not be language dependant. For example, the Product Number place holder need not, in certain circumstances be language dependant, however, the Product Description may be dependant on the query language. Accordingly, in one embodiment, the template may be populated with both language dependant and language independent data. Thus, in certain embodiments, the customer data tables 70 my include language dependant and language independent data, the product data tables 72 may include data in the plurality of different languages supported by the application 50, the locale data tables 74 may be dependant on language, and the other relevant data tables 76 may or may not be dependant on the query language, depending upon how the application 50 is configured. When the application 50 populates the particular template in the particular query language, template data in the query language is thus selected from data provided in a plurality of different languages. The locale data is then used to define the format or manner in which the template data is included in the template.

Referring in particular FIG. 6, an exemplary locale data table 80 is illustrated from which appropriate locale data is retrieved to define the format in which the template data is to be included in the template. In one embodiment, sets of locale data are provided wherein each set corresponds to a particular query language. As mentioned above, in one embodiment the locale data includes a set of locale rules that define how data is to be displayed or formatted in each particular template. The locale rules are used to format the data so that, in one embodiment, when the template is read it is in a format corresponding to a particular geographical convention associated with the query language. Typical examples of locale data are dates, times, numbers, currency based data, or the like.

Figure 10:
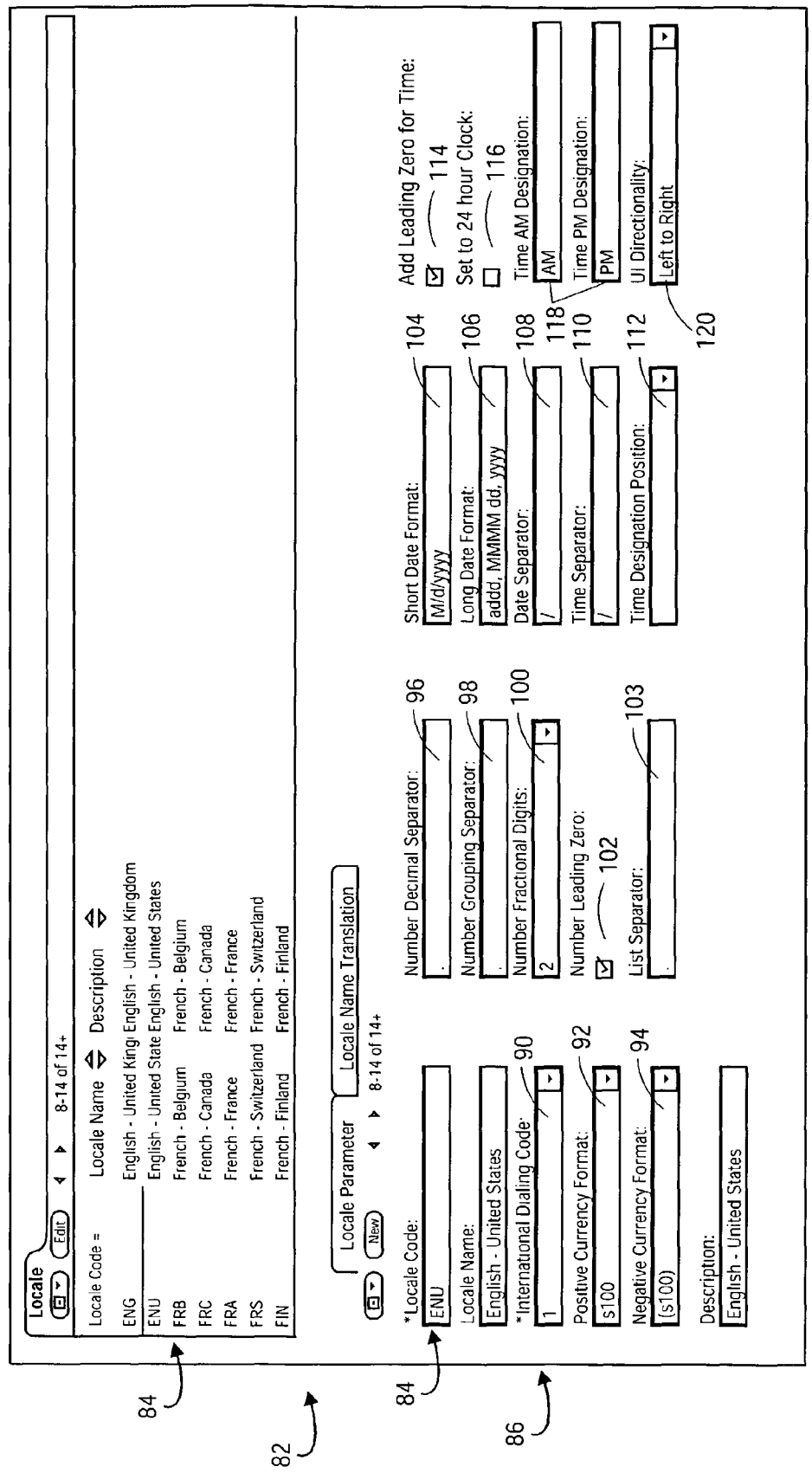
FIG. 10 shows an exemplary screen shot of a user interface for configuring locale data.

In one embodiment, the locale data is defined during a configuration operation with the aid of a user interface 82 of FIG. 10. In order to identify a particular locale set corresponding with a particular query language, a locale code 84 is provided. In one embodiment, the locale codes are internationally accepted codes or commonly known codes such as those provided by Microsoft™. However, it is to be appreciated that the Microsoft™ codes are provided merely by way of example and that any other standard or non-standard codes can be used. When configuring the computer 24 to run the application 50, an administrator may select the particular locale code 84 and enter the relevant data in a form 86 of FIG. 10. In certain embodiments, default values are provided to facilitate configuration. Any one or more of the fields 86 may be used to define the format in which the template data is displayed in the template. For example, each locale code 84 may be defined in terms of any one or more of an international dialing code 90, a positive currency format 92, a negative currency format 94, a number decimal separator 96, a number grouping separator 98, a number of fractional digits 100, a number of leading zeros 102, a list separator 103, a short date format 104, a long date format 106, a date separator 108, a time separator 110, a time designator position 112, an option to add a leading zero for time 114, an option to set a twenty-four hour clock 116, an AM/PM time designator 118, and a user interface directionality facility 120.

Returning to FIG. 6, the locale data table 80 shows schematically how different configurations or data formats are associated with each locale code 84. For example, when the query language is English-USA, then the locale code 84 is ENU and the template data is formatted so that a date is shown as MM/DD/YY and a currency is shown in US Dollars. Likewise, if the query language is English-United Kingdom, then the locale code 84 is ENG and the template data is formatted so that the date is displayed as DD/MM/YY and the currency is British Pounds. In a similar fashion in other embodiments, various other locale codes 84 may provide a format in which the template data is displayed so that a recipient of the response receives a customized response in a format customarily used in their particular language.

Referring in particular to FIG. 7, an exemplary product data table 122 is illustrated from which appropriate product data is retrieved for populating the template. The exemplary product data table 122 includes a plurality of product names 124 and product descriptions 126 which are identified as translatable items. The exemplary product data table 122 further includes translation table names 128 which identify an exemplary translation table 130 of FIG. 8, which includes translations of product descriptions and product names in each of the languages supported by the application 50. Thus, in one embodiment, when populating the template, a product description and a product name set out in the query language is imported or populated into the template.

In certain embodiments, the application 50 includes the other relevant data tables 76 of FIG. 5 in various different languages for inclusion in the chosen template. For example, a multi-lingual list of values (MLOV) table 132 of FIG. 9 is provided in certain embodiments. The MLOV table 132 may include a data type e.g. a salutation 134 and, associated with each data type 134, is a name 136, a value 138 and a language code 140. Accordingly, in certain embodiments, when the query language has been identified, the language code 140 may be identified and used to retrieve relevant data from the MLOV table 132 to populate the template with data associated with the query language. For example, when the type is a salutation 134, and the language code is English (ENG), the value 138 would then be "Mr." However, when the language code 140 is French (FRA) then the value 138 would then be "Monsieur."

Referring in particular to FIGS. 11 to 16 of the drawings, an embodiment of an object orientated implementation of the application 50 is provided. In the embodiment depicted in FIGS. 11 to 16, the application 50 is a multi-threaded application in which an object manager hosts the logic to process the queries.

Figure 11:
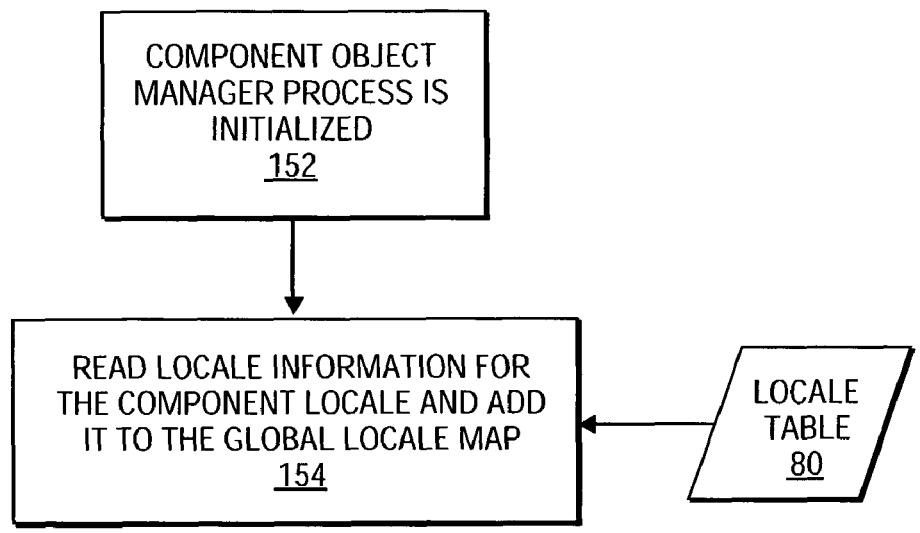
FIG. 11 shows a schematic flow diagram of initialization of an object manager process.

FIG. 11 illustrates an exemplary flow diagram of an initialization process to initialize the object manager. During the initialization process, in block 152 a component object manager process is first initialized whereafter locale information for a component locale is read and added to a global locale map in block 154. The locale information may be read from the locale data table 80 of FIG. 6 when particular locale information, associated with a particular query language, is required. In one embodiment, the locale information is then cached. When a query in a different language requires locale information that has not already been cached, locale information, associated with the different query language, is once again read from the locale data table 80 and added to the cache. Thus, in one embodiment, the particular locale information is dependent upon the query language and, accordingly, locale information specific to a particular query language is added to the cache each time a query in a different language is received by the application 50.

Figure 12:
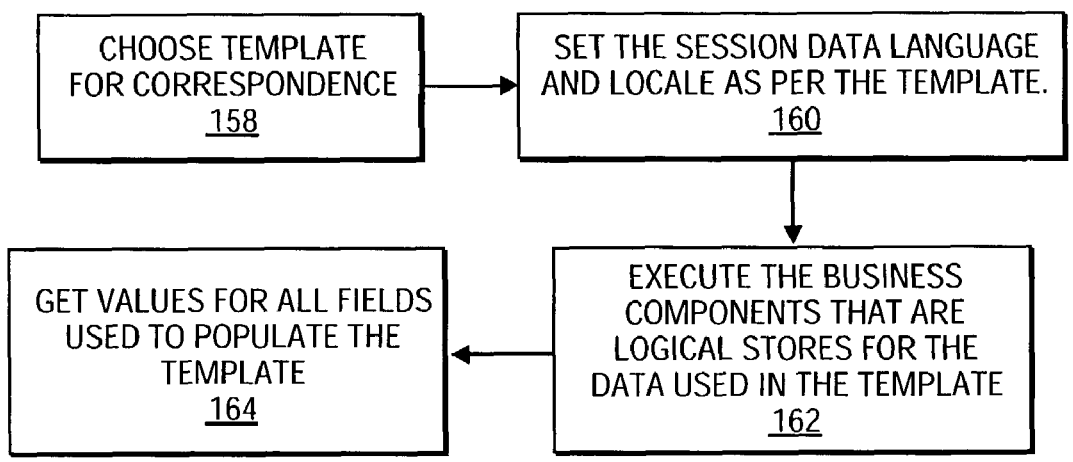
FIG. 12 shows a schematic flow diagram of exemplary application logic to populate a correspondence template.

Once the locale information associated with the query language has been retrieved, and an appropriate template in the query language has been identified, the template is then populated as discussed above with reference to block 58 in FIG. 4. Referring in particular to FIG. 12, exemplary application logic of the application 50 to populate correspondence templates is illustrated. The application logic in block 158 initially chooses a particular template for the correspondence or query response that is to be communicated to the recipient. Choosing the appropriate template relates both to choosing an appropriate template that addresses the content of the query as well as choosing the language of the appropriate template, which is typically the query language. Once the query language has been identified, in block 160 the session data language code 140 of FIG. 9 and the session locale code 84 of FIG. 6 are set. Thereafter, in block 162 business components that are logical stores for the data used in the template are executed and values are obtained, for example, from the MLOV table 132 of FIG. 9, which are then used to populate the template in block 164 of FIG. 12.

Figure 13:
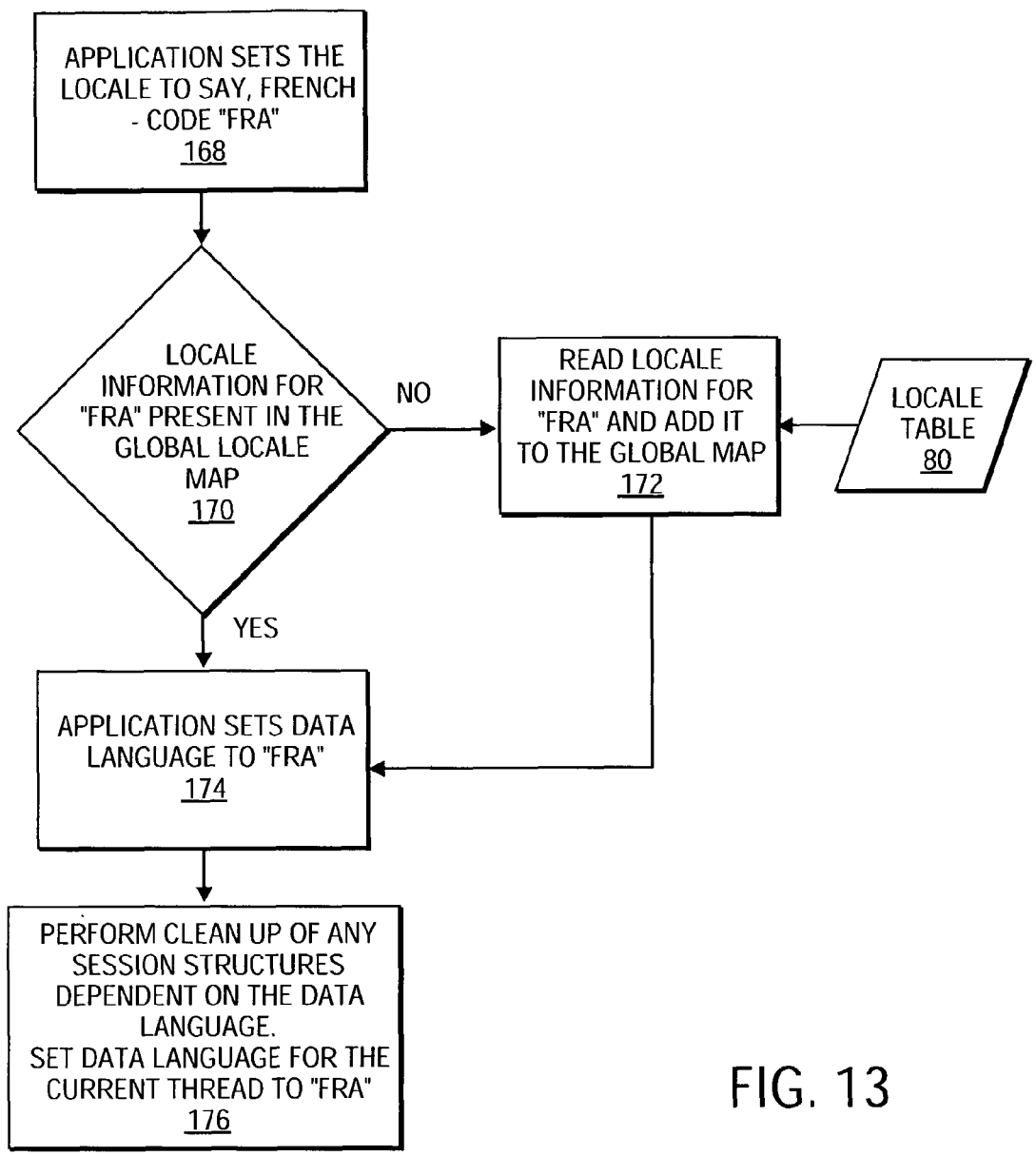
FIG. 13 shows a schematic flow diagram of exemplary logic in the object manager when the application switches its session locale and data language.

Exemplary functionality in setting the session data language code 140 and the locale code 84 in block 160 of FIG. 12 is described in more detail in FIG. 13. In block 168 of FIG. 13, the logic in the object manager switches the session locale code 84 and data language code 140 to accommodate a query in a different language. For example, assuming the application 50 sets the locale code 84 to French (code FRA) as shown in block 168, then the logic in block 170 of FIG. 13 checks to ascertain whether or not the locale information or data for French is present in the global locale map. If the locale information is not present in the global locale map, then in block 172 the locale information is read from the locale data table 80 of FIG. 6 and stored in cache, and the logic thereafter proceeds to block 174 in FIG. 13. If, however, the locale information is already present in the global locale map, then the logic proceeds directly from block 170 to 174. In block 174 the application 50 sets the data language code 140 for the particular session to French. The data language code 140 is thus the language in which the query is to be responded to and is thus the same as the query language. After the data language code 140 has been set, the logic of FIG. 13 in block 176 then performs a clean up operation of any session structures dependent on the data language code 140 and sets the data language for the current thread to French.

Figure 14:
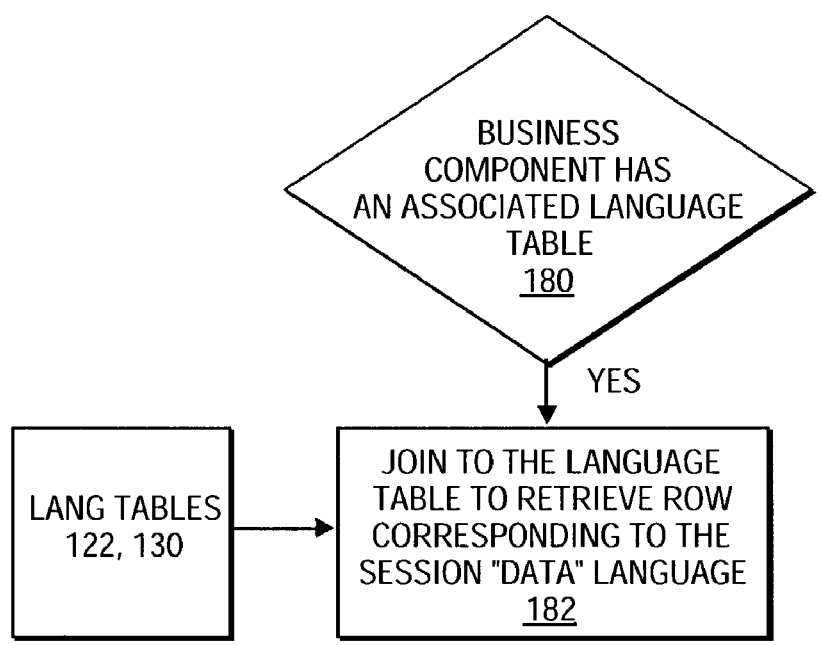
FIG. 14 shows a schematic flow diagram of exemplary logic in the object manager to support multi-lingual data when a business component is executed.

As mentioned above with reference to block 162 of FIG. 12, the application logic executes business components and this logic or functionality is shown in more detail in FIG. 14. In particular, FIG. 14 illustrates exemplary logic in the object manager to support the multi-lingual data when the business component is executed. The logic in block 180 of FIG. 14 initially identifies whether a particular business component has associated language dependent tables such as the product data table 122 and the translation table 130 of FIGS. 7 and 8 respectively. This may be required as, in certain embodiments, not all template data may be language dependant and thus include translations in different languages for inclusion in the particular template. If the business component has an associated language component, then in block 182 the translation table 130 is joined to retrieve a row corresponding to the session data language code 140 so that template data in the particular language of the chosen template is retrieved to populate the template.

Figure 15:
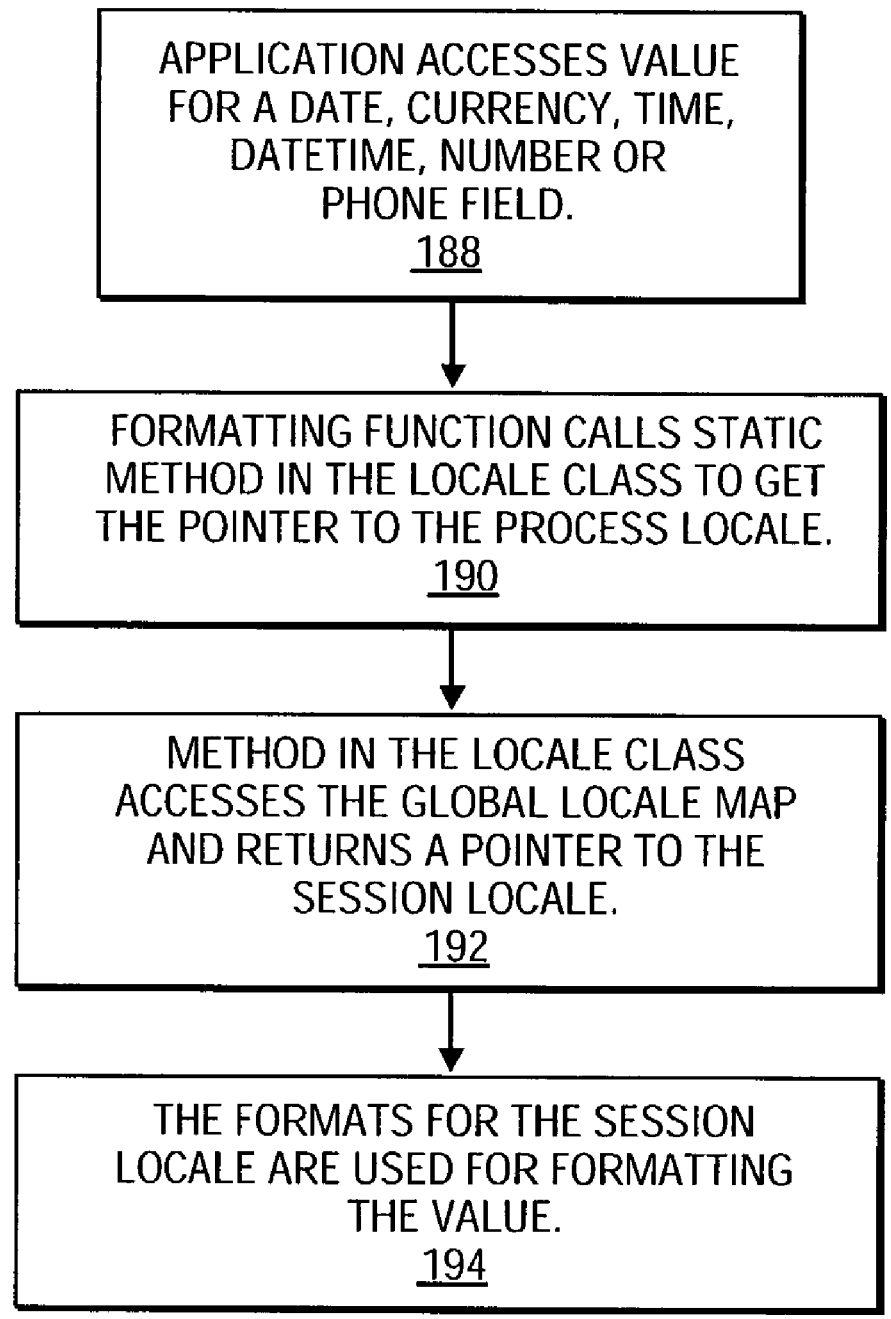
FIG. 15 shows a schematic flow diagram of exemplary logic in the object manager when formatting a datum.

Referring in particular to FIG. 15, a schematic flow diagram is illustrated that describes exemplary logic in the object manager when the application obtains locale data. In one embodiment, in block 188 the application 50 accesses a value for a Date, Currency, Time, DateTime, Number or Phone field required for the template. As the preferred format of the aforementioned values may differ from locale to locale, the formatting function calls a static method in block 190 in a locale class to get a pointer to point to the particular process locale. The pointer is defined with reference to the global locale map which is the map of the locale information for the particular query language stored in cache, as described above in block 154 of FIG. 11 and block 172 of FIG. 13. Thus, in block 192 of FIG. 15, the method in the locale class accesses the global locale map and returns a pointer to the specific locale used in the current session, and thereafter formats the template data for the specific session locale in block 194 in FIG. 15 using the locale data table 80 of FIG. 6. It is important to bear in mind that, in certain embodiments, the application 50 is multi-threaded and, accordingly, the pointer may relate to a specific thread of one of a plurality of different threads that each relate to a different query.

Figure 16:
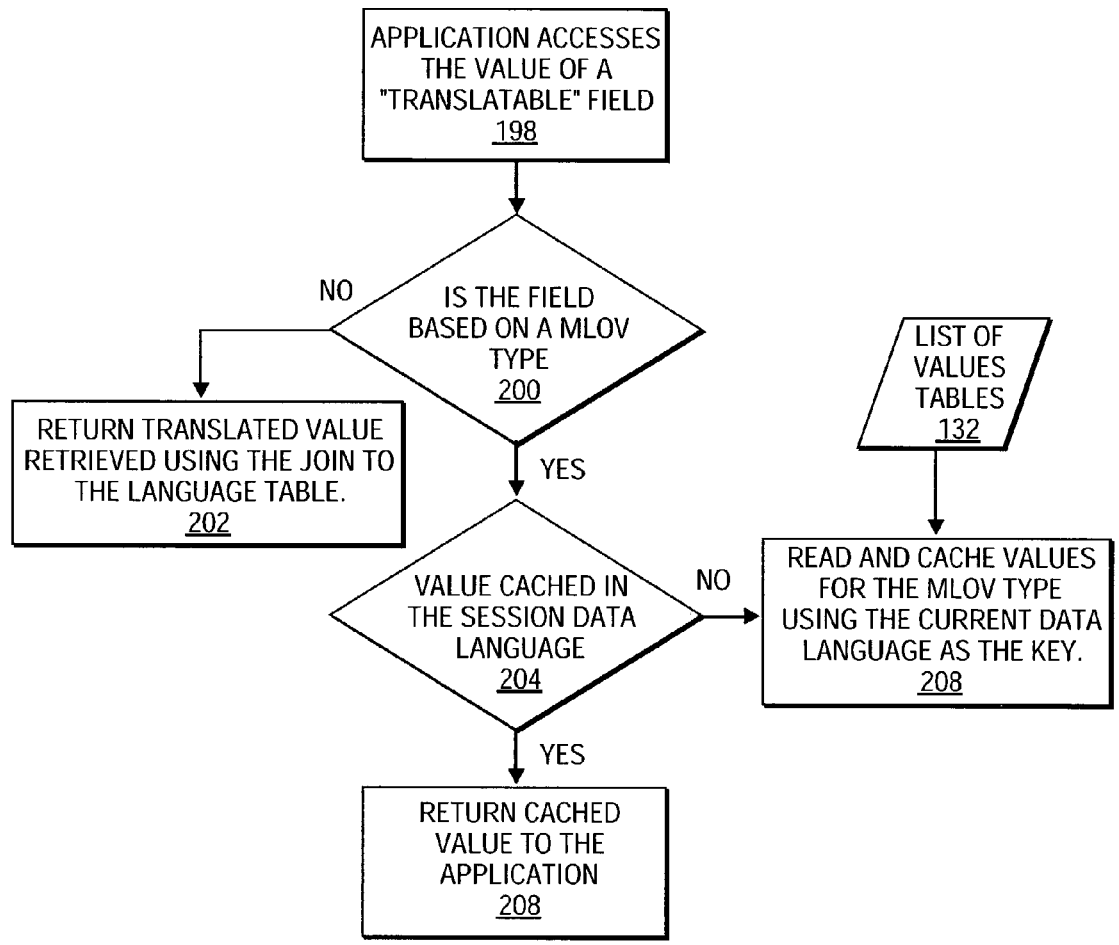
FIG. 16 shows a schematic block diagram of access by the application to a value of a translatable field.

Referring in particular to FIG. 16, in block 198 the application logic accesses the value of a translatable field. In block 200, the logic checks to determine whether or not the field is based on data provided in the MLOV table 132 of FIG. 9 and, if not, a translated value is retrieved in block 202 from the translation table 130. However, if the field is based on data provided in the MLOV table 132, then in block 204 the logic of FIG. 16 checks to determine whether or not the values required for the session query language are cached. If the values are not cached in the session query language, then in block 132 of FIG. 16 the logic updates the cache by reading a list of values from the MLOV table 132 of FIG. 9 associated with the query language, and in block 206 stores the values in cache. If the values are already stored in cache, then in block 208 the cached valued is returned to the application 50.

Thus, the object orientated embodiment of the application 50 allows multiple threads to run on the computer 24 so that queries in different query languages may be processed. As each thread is processed, the language code 140 of the product data table 122 of FIG. 8 and the translation table of FIG. 9 is set for the particular thread. Likewise, as each thread is processed, the locale code 84 of the locale data table 80 is set. It is important to appreciate that the tables of FIGS. 6 to 9 are merely provided by way of example. Thus, dependent upon the circumstances, a variety of different tables may be provided to populate the template with template data in an appropriate language.

Figure 17:
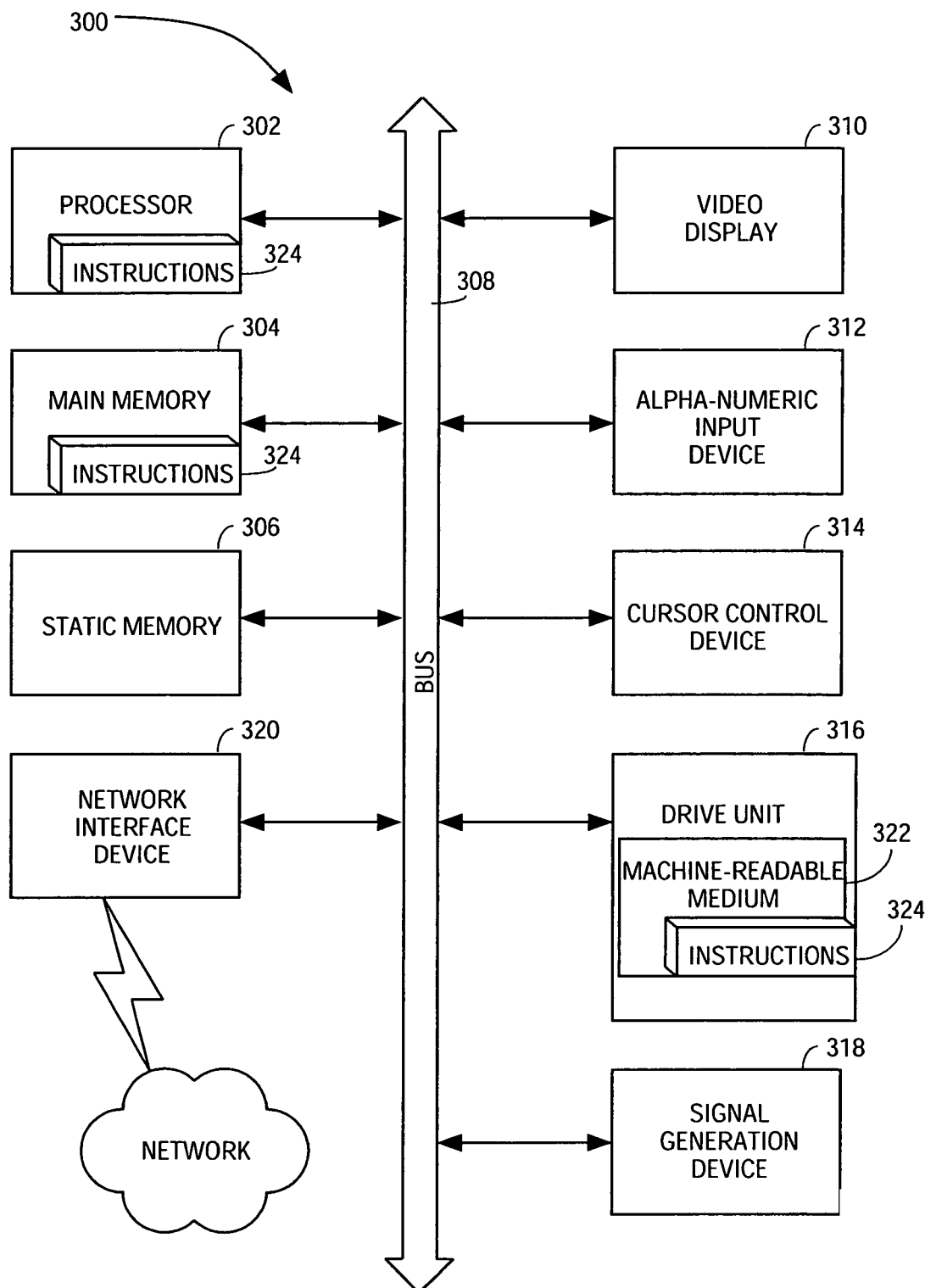
FIG. 17 shows a schematic exemplary hardware block diagram of the computer of FIG. 1.

FIG. 17 shows a diagrammatic representation of machine in the exemplary form of the computer system 300 within which a set of instructions, for causing the machine to perform any one of the methodologies discussed above, may be executed.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g. a keyboard), a cursor control device 314 (e.g. a mouse), a disk drive unit 316, a signal generation device 318 (e.g. a speaker) and a network interface device 320.

The disk drive unit 316 includes a machine-readable medium 322 on which is stored a set of instructions (software) 324 embodying any one, or all, of the methodologies described above. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and computer for responding to a query in any one of a plurality of languages have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
   receiving a first customer query;
   receiving a second customer query;
   determining that the first customer query is in a first language;
   determining that the second customer query is in a second language different from the first language;
   selecting a first template from a plurality of templates in a corresponding plurality of different languages, wherein the first template is of a type that answers the first customer query, and
the first template corresponds to the first language;
selecting a second template from the plurality of templates, wherein
the second template corresponds to the second language;
populating, using a processor, the first template with first template data, wherein
the populating the first template is performed by a first thread in a multi-threaded process,
the populating the first template is based at least in part on a first set of locale rules associated with the first language;
formatting, based at least in part on the first set of locale rules, the first template data in the first template, wherein
the formatting the first template data comprises obtaining a first pointer to a first set of data,
the first set of data is associated with the first thread, and
the first set of data corresponds to the first set of locale rules;
formatting second template data in the second template; and
transmitting the formatted first template data.

2. The method of claim 1, comprising:
retrieving the first template data, wherein
the first template data correspond to the first language, and
the populating the first template comprises generating a first response to the first customer query in the first language; and
communicating the first response to a recipient.

3. The method of claim 2, wherein when a plurality of different template types are provided for different types of queries, the method comprising:
identifying a first template type for the first customer query from the plurality of template types; and
the first template is of the first template type.

4. The method of claim 2, comprising:
populating a plurality of different templates each relating to a separate query in the multi-threaded process.

5. The method of claim 4, wherein:
a first thread of the multi-threaded process populates the first template in the first language;
concurrently with the first thread, a second thread of the multi-threaded process populates the second template in the second language.

6. The method of claim 2, comprising:
retrieving salutation data and product data in the first language.

7. The method of claim 2, comprising:
monitoring selection of a particular language by an agent, and
switching dynamically to the selected particular language from one of the plurality of languages.

8. The method of claim 2, comprising:
displaying the first template to an agent in a selected agent language, and
populating the first template in the first language, the selected agent language and the first language being different languages.

9. The method of claim 8, wherein the first customer query is received in the computer in the form of an e-mail message, and the first response is communicated to the recipient as an e-mail message.

10. The method of claim 2, wherein when the first customer query is a structured query, the method comprising:
automatically identifying the first language; and
automatically identifying an appropriate template from the structured query.

11. The method of claim 10, which the first customer query is received via the Internet using a structured web form.

12. The method of claim 1, wherein the first set of locale rules is selected from a plurality of sets of locale rules wherein each set of locale rules is associated with at least one language from the plurality of languages.

13. The method of claim 12, wherein each set of locale rules defines at least one of a date separator, an international dialing code, a list separator, a locale code, a locale name, a long date format, a negative currency format, a number decimal format, a number of fractional digits, a number grouping separator, a number of leading zeros, a positive currency format, a short date format, a time format designator, or a time separator.

14. The method of claim 1, comprising:
presenting the formatted first template data.

15. The method of claim 14, wherein the presenting comprises storing the formatted first template data in a memory.

16. The method of claim 1, wherein:
the different languages of the plurality of templates comprise each of Portuguese, German, U.K. English, U.S. English, Belgian French, Canadian French, and a French of France;
a language is associated with a currency unit in a locale data table;
the first customer query is answered using a multi-threaded process;
salutation values are stored in a table;
languages are represented with a locale code; and
a formatting function calls a static method in a locale class to a pointer to a particular process locale.

17. The method of claim 1, comprising:
populating the second template with second template data based at least in part on a second set of locale rules associated with the second language.

18. The method of claim 1, wherein:
the formatting the second template data comprises obtaining a second pointer to a second set of data;
the second set of data is associated with a second thread in the multi-threaded process; and
the second set of data corresponds to a second set of locale rules associated with the second language.

19. A machine-readable storage medium comprising a plurality of instructions encoded thereon that, when executed by a processing system, cause the processing system to:
receive a first customer query;
receive a second customer query;
determine that the first customer query is in a first language;
determine that the second customer query is in a second language different from the first language;
select a first template from a plurality of templates in a corresponding plurality of different languages, wherein
the first template is of a type that answers the first customer query, and
the first template corresponds to the first language;
select a second template from the plurality of templates, wherein
the second template corresponds to the second language;
populate the first template with first template data, wherein
the first template is populated based at least in part on a first thread in a multi-threaded process, and
the first template is populated based at least in part on a first set of locale rules associated with the first language;

format, based at least in part on the first set of locale rules,
the first template data in the first template, wherein
the first template data is formatted based at least in part on a first pointer to a first set of data,
the first set of data is associated with the first thread, and
the first set of data corresponds to the first set of locale rules; and
format second template data in the second template.

20. The machine-readable storage medium of claim 19, wherein when executed the instructions cause the processing system to:
retrieve the first template data, wherein
the first template data correspond to the first language;
populate the first template with the first template data to define a first response in the first language; and
communicate the first response to a recipient.

21. The machine-readable storage medium of claim 20, wherein when executed the instructions cause the processing system to populate a plurality of different templates each relating to a different query in the multi-threaded process.

22. The machine-readable storage medium of claim 21, wherein at least two threads of the multi-threaded process populate their associated templates concurrently in different languages.

23. The machine-readable storage medium of claim 20, wherein a plurality of different template types are provided for different types of queries, a template type from the plurality of template types is identified, and the first template is retrieved in the first language.

24. The machine-readable storage medium of claim 20, wherein salutation data and product data is retrieved in the first language.

25. The machine-readable storage medium of claim 20, wherein the first set of locale rules is selected from a plurality of sets of locale rules wherein each set of locale rules is associated with at least one language from the plurality of languages.

26. The machine-readable storage medium of claim 25, wherein each set of locale rules defines at least one of a date separator, an international dialing code, a list separator, a locale code, a locale name, a long date format, a negative currency format, a number decimal format, a number of fractional digits, a number grouping separator, a number of leading zeros, a positive currency format, a short date format, a time format designator, or a time separator.

27. The machine-readable storage medium of claim 20, wherein selection of a particular language by an agent is monitored, and the instructions cause the processing system to switch dynamically to the selected particular language from one of the plurality of languages.

28. The machine-readable storage medium of claim 20, wherein the first template is displayed to an agent in a selected agent language, and the first template is populated in the first language, the selected agent language and first language being different languages.

29. The machine-readable storage medium of claim 28, wherein the first customer query is received in the processing system in the form of an e-mail message, and the first response is communicated to the recipient as an e-mail message.

30. The machine-readable storage medium of claim 20, wherein when the first customer query is a structured query, the instructions cause the processing system to:
automatically identify the first language; and
automatically identify an appropriate template from the structured query.

31. The machine-readable storage medium of claim 30, wherein the first customer query is received via the Internet using a structured web form.

32. A computer comprising:
a database configured to store a plurality of templates in a corresponding plurality of different languages; and
a processor coupled to the database, the processor configured to
receive a first customer query;
receive a second customer query;
determine that the first customer query is in a first language;
determine that the second customer query is in a second language different from the first language;
select a first template from the plurality of templates, wherein
the first template is of a type that answers the first customer query, and
the first template corresponds to the first language;
select a second template from the plurality of templates, wherein
the second template corresponds to the second language;
populate the first template with first template data, wherein
the first template is populated based at least in part on a first thread in a multi-threaded process, and
the first template is populated based at least in part on a first set of locale rules associated with the first language;
format, based at least in part on the first set of locale rules, the first template data in the first template, wherein
the first template data is formatted based at least in part on a first pointer to a first set of data,
the first set of data is associated with the first thread, and
the first set of data corresponds to the first set of locale rules; and
format second template data in the second template.

33. The computer of claim 32, wherein the processor is configured to:
retrieve the first template data from the database, wherein
the first template data correspond to the first language;
populate the first template with the first template data to define a first response in the first language; and
communicate the first response to a recipient.

34. The computer of claim 33, wherein a plurality of different templates each relating to a separate query are populated in the multi-threaded process.

35. The computer of claim 34, wherein at least two threads of the multi-threaded process concurrently populate their associated templates in different languages.

36. The computer of claim 33, wherein when a plurality of different template types are provided for different types of queries, the processor identifies a template type for the first customer query from the plurality of template types, and retrieves the first template in the first language.

37. The computer of claim 36, wherein salutation data and product data are retrieved from the database in the first language.

38. The computer of claim 33, wherein selection of a particular language by an agent is monitored, and the processor switches dynamically to the particular language from any one of the plurality of languages.

39. The computer of claim 33, wherein the first template is displayed to an agent in a selected agent language, and the first template is populated in the first language, the selected agent language and first language being different languages.

40. The computer of claim 39, wherein the first customer query is in the form of an e-mail message, and the first response is communicated to the recipient as an e-mail message.

41. The computer of claim 33, wherein when the first customer query is a structured query, the processor:
automatically identifies the first language; and
automatically identifies an appropriate template from the structured query.

42. The computer of claim 41, wherein the first customer query is received via the Internet using a structured web form.

43. The computer of claim 32, wherein the first set of locale rules is selected from a plurality of sets of locale rules wherein each set of locale rules is associated with at least one language from the plurality of languages.

44. The computer of claim 43, wherein each set of locale rules defines at least one of a date separator, an international dialing code, a list separator, a locale code, a locale name, a long date format, a negative currency format, a number decimal format, a number of fractional digits, a number grouping separator, a number of leading zeros, a positive currency format, a short date format, a time format designator, or a time separator.

45. A system comprising:
means for storing a plurality of templates in a corresponding plurality of different languages;
means for receiving a first customer query;
means for receiving a second customer query;
means for determining that the first customer query is in a first language;
means for determining that the second customer query is in a second language different from the first language;
means for selecting a first template from the plurality of templates, wherein
the first template is of a type that answers the first customer query,
the means for selecting the first template is coupled to the means for determining that the first customer query is in the first language, and
the first template corresponds to the first language;
means for selecting a second template from the plurality of templates, wherein
the second template corresponds to the second language;
means for populating the first template with first template data, wherein
the populating the first template is performed by a first thread in a multi-threaded process,
the populating the first template is based at least in part on a first set of locale rules associated with the first language;
means for formatting, based at least in part on the first set of locale rules, the first template data in the first template, wherein
the formatting the first template data comprises obtaining a first pointer to a first set of data,
the first set of data is associated with the first thread, and
the first set of data corresponds to the first set of locale rules; and
means for formatting second template data in the second template.

46. A computer-implemented method comprising:
receiving a first customer query;
receiving a second customer query;
determining that the first customer query is in a first language;
determining that the second customer query is in a second language different from the first language;
selecting a template from a plurality of templates in a corresponding plurality of different languages, the template comprising
information responsive to the first customer query, wherein the information is in the first language,
a first field for language-independent and locale-dependent data, and
a second field for language-dependent data;
populating, using a processor, the first and second fields with data responsive to the first customer query, wherein
the populating the first and second fields is performed by a first thread in a multi-threaded process,
the populating the first and second fields is based at least in part on a first set of locale rules associated with the first language;
formatting, based at least in part on the first set of locale rules, data in the first field according to a format that corresponds to the first language, wherein
the formatting the data in the first field comprises obtaining a first pointer to a first set of data,
the first set of data is associated with the first thread, and
the first set of data corresponds to the first set of locale rules;
formatting data in the second template.

47. The computer-implemented method of claim 46, wherein the first field is a date field.

48. The computer-implemented method of claim 46, wherein the second field is a service status field.

49. The computer-implemented method of claim 46, wherein the first field is a date field and the second field is a product description field.

50. The computer-implemented method of claim 46, wherein the query is received from a first computer system, the method comprising:
generating a response to the query, wherein the generating the response comprises the populating the first and second fields; and
transmitting the response to the first computer system.

51. The computer-implemented method of claim 50, wherein the generating the response comprises generating a response that answers the query.

52. The method of claim 46, wherein the populating the first and second fields comprises:
obtaining a second pointer relating to a second set of locale rules associated with the second language; and
the formatting the second template data is based at least in part on the second set of locale rules.

53. The method of claim 52, wherein
the first pointer relates to a specific thread among a plurality of different threads; and
each thread in the multi-treaded process relates to a different corresponding customer query.

54. The method of claim 52, wherein the obtaining the second pointer comprises:
calling a static method in a locale class.

55. The computer-implemented method of claim 46, wherein the populating the first and second fields is performed prior to the formatting data in the first field.

56. A computer-implemented method comprising:
receiving a first query;
displaying a plurality of candidate response templates in a user interface, wherein the candidate response templates are displayed in an agent language selected by a user;

displaying candidate response data for populating the candidate response templates, wherein the candidate response data is displayed in the agent language;
receiving an input via a user interface, wherein
- the input identifies that the first query is in a first query language,
- the first query language is different from the agent language, and
- the input selects a first suitable response template from among the candidate response templates;

selecting a first outgoing response template, wherein
- the first outgoing response template is in the first query language, and
- the first outgoing response template corresponds to the first suitable response template;

populating, using a processor, the first outgoing response template with first response data, wherein
- the populating the first outgoing response template is performed by a first thread in a multi-threaded process,
- the first response data is obtained using a first pointer to a first set of data;
- the first response data is based at least in part on the first set of data,
- the first set of data corresponds to the first thread and to the first query language;

receiving a second query in a second query language; and
populating the second outgoing response template with second response data.

57. The computer-implemented method of claim 56, further comprising:
- populating the first suitable response template with first response data in the agent language;
- displaying the first suitable response template populated with the response data in the agent language; and
- transmitting the outgoing response template populated with the response data in the query language.

\* \* \* \* \*